W. G. SMITH.
SPREADER AND SWIVEL FOR ROPE MAKING.
APPLICATION FILED OCT. 3, 1917.

1,366,429.

Patented Jan. 25, 1921.

Inventor:
Wilson G. Smith,
By Ino Bloxdale
Attorney.

UNITED STATES PATENT OFFICE.

WILSON G. SMITH, OF CLEVELAND, OHIO, ASSIGNOR TO WILLIAM H. FULLINGTON AND ARTHUR H. SAMPSON, BOTH OF CLEVELAND, OHIO.

SPREADER AND SWIVEL FOR ROPE-MAKING.

1,366,429.     Specification of Letters Patent.     Patented Jan. 25, 1921.

Application filed October 3, 1917. Serial No. 194,428.

*To all whom it may concern:*

Be it known that I, WILSON G. SMITH, a citizen of the United States, residing at Cleveland, in the county of Cuyahoga, State of Ohio, have invented a new and useful Spreader and Swivel for Rope-Making, of which the following is a specification.

My invention relates to improvements in spreader and swivel for rope making. The object is to provide an improved mechanism for use especially in connection with making rope on a hand rope machine.

The invention includes improved formation of the guide channels in the spreader adapted to secure sufficient tension on the strands and thus cause the spreader to operate automatically without the assistance of any auxiliary tension devices.

The invention also comprises improvements in the swivel hook adapted to operate in combination with a spreader.

Referring to the drawings, which illustrate merely by way of example a suitable embodiment of my invention—

Similar numerals refer to similar parts throughout the several views.

Figure 1:
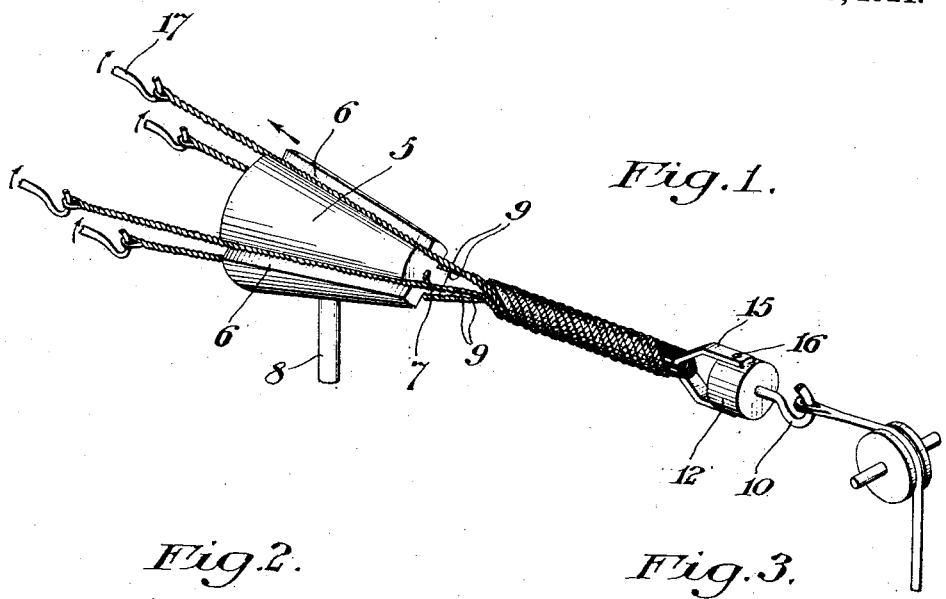
Figure 1 is a view in perspective.
Figures 2, 3:
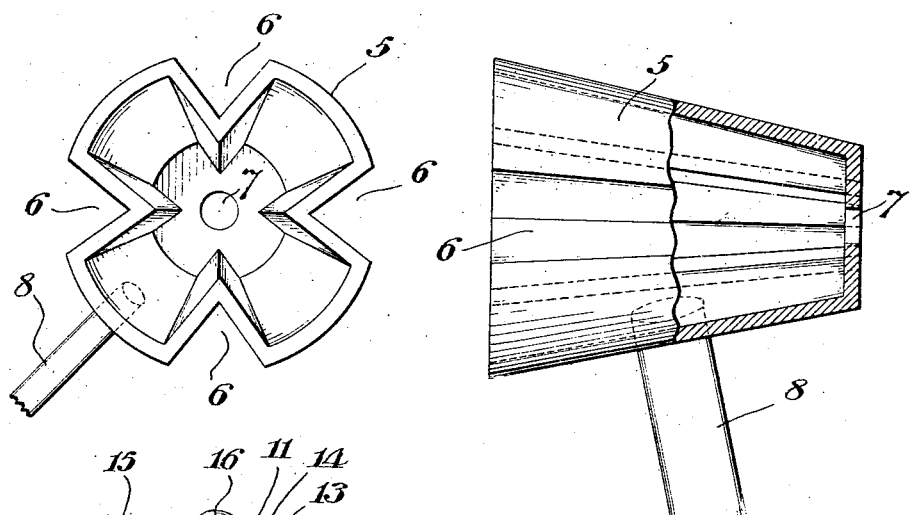
Fig. 2 is a front elevation of the spreader on an enlarged scale.
Fig. 3 is a side elevation of same partly in section.

The spreader body 5 is preferably in the form of a hollow casting tapering toward one end and provided with the four longitudinal V-shaped channels 6 symmetrically arranged. At the smaller end of the spreader body is also provided the opening 7. Body 5 is also provided with a handle 8.

The V-shaped formation of the channels 6 serves to pinch the strands 9 sufficiently to secure automatically a proper tension of the strands and to prevent the spreader from jumping forward too fast. This results in giving the rope an even weave.

This tension is secured by the V-shaped formation alone and without the aid of any tension hooks or other auxiliary tension devices.

Figure 4:
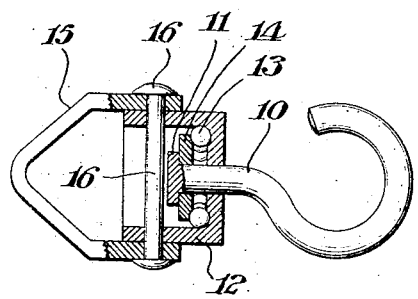
Fig. 4 is a sectional elevation of the swivel hook.

The opening 7 is provided for a central strand or wire, when it is desired to wind the strands 9 upon the same. The small handle 8 is provided for holding the spreader from turning. The swivel, as shown in Fig. 4, comprises the hook member 10 having the head 11 at the base of its stem. A cup shaped housing 12 is provided, through the base of which extends the stem of the hook 10. Within this housing 12 are provided the balls 13, or other suitable anti-friction devices. A washer 14 is interposed between the balls 13 and the head 11. A yoke 15 is secured to the housing 12 by the rivet pin 16. This rivet pin passing over the head 11 prevents displacement of the head 11, washer 14 and balls 13. In this way is provided an extremely simple and efficient formation of swivel, easy to assemble.

In operation the several strands 9 are twisted by the rotating hooks 17 in the usual way. As the tension of strands 9, due to the twisting, increases the strands in their tendency to untwist individually are twisted together as they pass beyond the channels 6 from the small end of the spreader. This twisting together is facilitated by the swivel comprising the hook 10 and yoke 15. The tension of the strands 9 due to their twisting tends to force the spreader 5 to the left, in the direction of the arrow, and if there was not some resistance to such movement the spreader would jump forward too rapidly and thus effect the even weave of the rope. It is, as above stated, the V-shaped formation of the channels 6 however that controls this movement and maintains a constant and sufficient tension of the strands, and thus, by automatically restraining, sufficiently, the movement of the spreader, secures an even weave or twist of the rope.

By making the spreader in the form of a hollow casting instead of a solid block of wood, as is now the common practice another advantage is derived in that it is more easy to secure the required weight of the spreader in respect to the work for which it is intended.

What I claim is:—

1. A spreader for rope making, comprising an elongated body having approximately parallel longitudinally extending and slightly converging channels, said channels being V-shaped in cross-section throughout their entire extension.

2. A spreader for rope making, comprising an elongated body of tapered formation having approximately parallel longitudinally extending channels, said channels being V-shaped in cross-section throughout their entire extension.

WILSON G. SMITH.